United States Patent [19]

Numba

[11] 3,948,162
[45] Apr. 6, 1976

[54] PRESS LINE SYSTEM
[75] Inventor: Munehiro Numba, Hino, Japan
[73] Assignee: Aida Engineering Limited, Japan
[22] Filed: Apr. 3, 1975
[21] Appl. No.: 564,885

Related U.S. Application Data

[63] Continuation-in-part of Ser. No. 429,833, Jan. 2, 1974, abandoned, which is a continuation of Ser. No. 227,518, Feb. 18, 1972, abandoned.

[30] Foreign Application Priority Data

Mar. 5, 1971   Japan.............................. 46-11989

[52] U.S. Cl. ...................... 100/45; 72/405; 72/419; 100/207
[51] Int. Cl.² ..................... B30B 15/30; B30B 15/32
[58] Field of Search ......... 100/207, 45; 72/405, 419

[56] References Cited
UNITED STATES PATENTS

| | | | |
|---|---|---|---|
| 3,199,439 | 8/1965 | Danly | 100/207 X |
| 3,199,443 | 8/1965 | Danly | 100/207 |
| 3,342,125 | 9/1967 | Curran | 100/207 |
| 3,407,724 | 10/1968 | Heiberger | 100/207 X |

Primary Examiner—Robert W. Jenkins
Assistant Examiner—Philip R. Coe
Attorney, Agent, or Firm—Holman & Stern

[57] ABSTRACT

A press line system in which there is provided a series of individually driven presses arranged in a line and each having a work loading means and an unloader and in which each of said presses is fed with a workpiece by activation of its associated loading means. As the loading means returns to its initial position, a signal is generated for operating the press for a stroke of operation. After the stroke of operation has been completed, a further signal is generated for actuating the unloader associated with the press for discharging the work from the press. An intermittently driven conveyor is arranged between adjacent presses for conveying the work from the preceding press to the succeeding press, said conveyor being advanced in increments in response to a signal generated as the conveyor receives the work from said unloader associated with the preceding press until the work on said conveyor reaches a predetermined work feed position with respect to the succeeding press whereby the succeeding press can be operated in synchronization with the preceding press without being affected by the operation of the preceding press.

3 Claims, 4 Drawing Figures

PRESS LINE SYSTEM

CROSS REFERENCE TO RELATED APPLICATIONS

This application is a continuation-in-part of Ser. No. 429,833 filed Jan. 2, 1974, which was a continuation of Ser. No. 227,518 filed Feb. 18, 1972, and now both abandoned.

BACKGROUND OF THE INVENTION

This invention relates to a press line system and more particularly to a novel and improved press line system in which a series of presses which are individually driven are arranged in a line in such a manner that the presses can operate in synchronization with each other without being affected by the operation of the respectively preceding presses in the line.

Various types of automatic press lines have been proposed and employed in practice to date. Many of the prior art automatic press line systems comprise a series of presses arranged in a line and having their associated loaders, unloaders and carriers electrically or mechanically connected to each other, the presses being operated in a perfect synchronized relationship for performing their particular operations. Although the above-mentioned prior art press lines are particularly suitable for high speed operation, they require expensive accessory facilities and lack versatility. Furthermore, in such prior art press line systems, the presses cannot operate individually.

SUMMARY OF THE INVENTION

Therefore, a principal object of the present invention is to provide a novel and improved press line which effectively eliminates the above-mentioned defects inherent in prior art press line systems.

A further object of the present invention is to provide a press line system in which a series of presses are individually driven and arranged in a line and are connected by means of intermittently driven conveyors in such a manner that when a workpiece is received by a conveyor from the preceding presses, the succeeding presses can be operated in synchronization.

A further object of the present invention is to provide a novel and improved press line system of high efficiency which comprises a series of presses which are arranged in a line and in which a selected number of the presses can be separately or synchronously operated, as desired.

According to the present invention, a series of individually driven presses are arranged in such a manner that (except for the leading press of the plurality of presses) in response to actuation of a loader associated with a particular press, a workpiece is fed thereto. As the loader returns to its initial or normal position, a signal is generated to actuate the press for a stroke operation on the workpiece. After the stroke operation by the press, an unloader associated with that particular press is actuated to remove the processed work from the press. An intermittently driven conveyor is provided between adjacent presses in the line for receiving a workpiece from the preceding press and for conveying the workpiece to the succeeding press. As the intermittently driven conveyor receives the workpiece from the unloader associated with the preceding press, a signal is generated for advancing the conveyor and, as the conveyor advances, when the workpiece has reached a predetermined feeding position with respect to the succeeding press, a signal is generated for actuating the loader associated with the succeeding press which, in turn, operates the succeeding press for a stroke operation. Thus, according to the present invention, any desired number of presses can be combined to provide a perfectly automatic press line. Since the automatic press line system operates under the control of the intermittently driven conveyor, which is advanced only when the conveyor receives a workpiece, the unloaders associated with the preceding presses will not necessarily be driven, i.e., only the desired number of presses will be operated in synchronization by supplying a workpiece onto an intermittently driven conveyor manually by an operator or any other suitable supply device whereupon all of the presses need not be driven in synchronization. Thus, the present invention has the advantage that a selected number of presses may be selectively operated.

According to the present invention, there is provided a press line system which comprises a series of individually driven presses arranged in a line and each having a loading means and an unloader, characterized by such an arrangement in that each of the presses is fed with a workpiece as its associated loading means is actuated. As the loading means returns to its initial position, a signal is generated for operating the press associated with the actuated loading means for a stroke of operation. A signal is generated in response to the completion of the stroke of operation for actuating the unloader associated with the press for discharging the workpiece from the preceding press. An intermittently driven conveyor is arranged between adjacent presses in the press line for conveying the workpiece from the preceding press to the succeeding press. As the unloader associated with the preceding press discharges the workpiece from the preceding press, a signal is generated to advance the conveyor until the work on the conveyor reaches a predetermined workpiece feed position with respect to the succeeding press for actuating the loader associated with this succeeding press whereby the succeeding press will be operated in synchronization with the preceding press without being directly affected by the operation thereof.

The above and other objects and attendant advantages of the present invention will be more readily apparent to those skilled in the art from a reading of the following detailed description of the same in conjunction with the accompanying drawings which show one preferred embodiment of the invention for illustration purposes only, but not for limiting the scope of the invention in any way.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
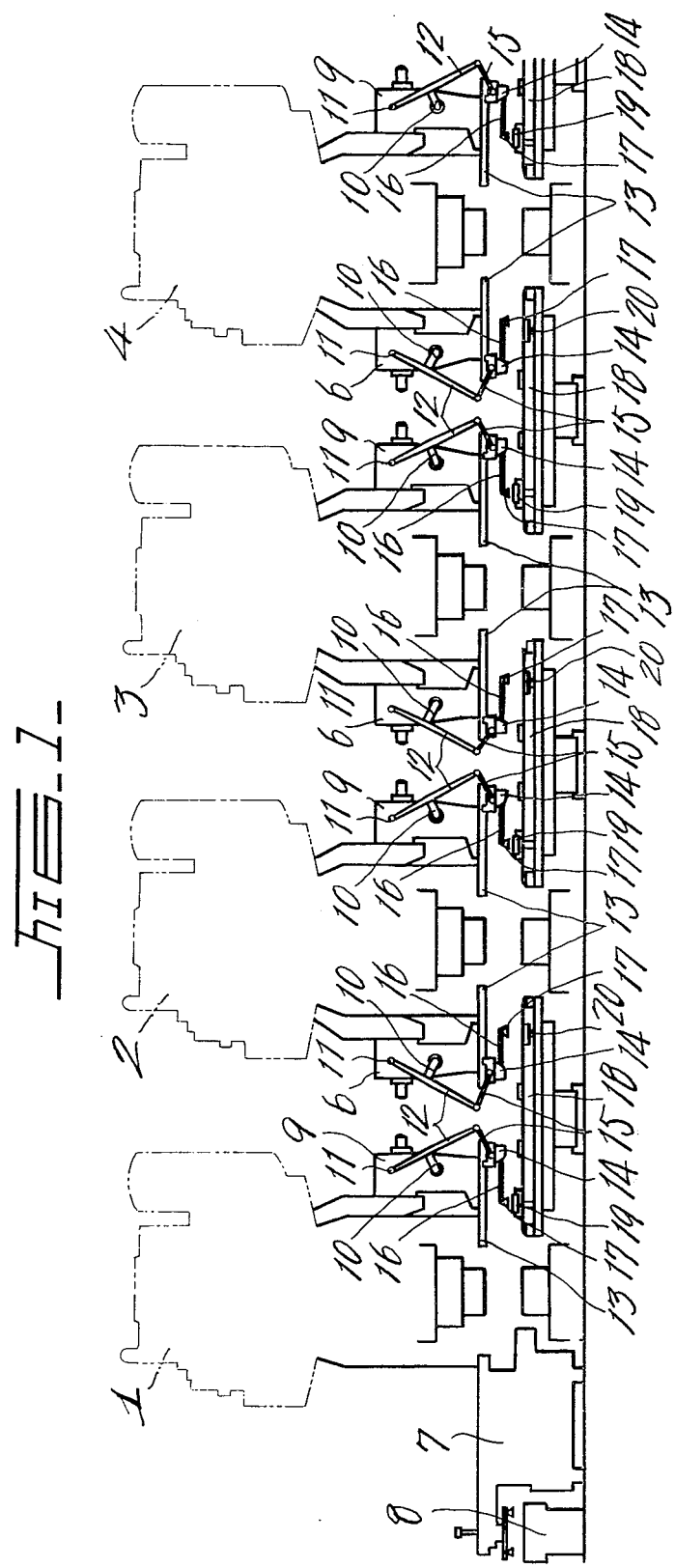
FIG. 1 is a diagrammatic view in elevation of a press line system embodying the present invention.

As shown in FIG. 1, a series of individually driven presses 1, 2, 3 and 4 are successively arranged in a line for performing different types of pressing operations on a workpiece, respectively, as is well known in the art. Although the number of presses is shown as being four in FIG. 1, it will be readily apparent to those skilled in the art that the number can be increased or decreased as desired depending upon the nature of operation to be performed on a particular workpiece. Except for the leading or first press 1, each of the presses 2–4 has a loader 6 on the feed side which is adapted to feed a workpiece into its associated press. Only the leading press 1 is provided with a workpiece feeder 7 in a workpiece supplying position adjacent to the feed side of the press 1 for receiving successive workpieces from a feed mechanism 8 disposed adjacent to the feeder 7 on the side opposite to the press 1 and for feeding the workpieces to the feeder 7 one at a time. Each of the presses, 1, 2, 3 and 4 has an unloader 9 attached thereto on the delivery or discharge side and each of the unloaders is adapted to transfer the workpiece which has been worked in the respectively associated press to the adjacent or immediately succeeding press to be subjected to a next step of an operation. All the loaders 6 and unloaders 9 respectively have the same construction and function in the same manner. The loaders 6 and unloaders 9 are not limited to those as shown in FIG. 1, but they may be of any acceptable construction provided they deliver and transfer the workpiece to the respectively succeeding presses in accordance with predetermined command signals, as will become apparent hereinafter.

The loaders 6 and unloaders 9 have crank arms 10 which are individually driven from their respectively associated individual drive sources (not shown in this view). Drive arms 12 are operatively connected to the crank arms 10 for non-uniform rocking movement right and left and vice versa about pins 11 on the loaders and unloaders (at a higher rate in a section from the beginning stage to a midpoint stage and at a lower rate in the remaining section from the midpoint to the terminal end in a predetermined rocking movement) whereby carriers 14 are caused to move reciprocally through a stroke between an advanced position (full right) and a retracted position (full left) along rails 13 by means of connection rods 15 which are pivotally connected to the drive arms 12 and carriers 14. The carriers 14 are momentarily stopped at both extreme ends of their reciprocal movement (i.e., at their fully advanced and fully retracted positions) by the actuation of limit switches (20 and 22 of FIG. 2A) placed thereat (the term "advance" as used herein means rightward movement of carriers 14 whereas "retract" means leftward movement thereof, as viewed in FIG. 1). Clamp units 17 are provided at the ends of the feed arms 16 and may be conveniently in the form of vacuum cups or the like in order to clamp the workpiece therein.

Immediately after a loader 6 has been actuated by a start cycle signal to be described in more detail later, a stroke operation thereof is automatically carried out which includes descent of the feed arm 16, clamping of the workpiece by the clamp unit 17, ascent of the feed arm 16, advance and stoppage of the carrier 14 in its extreme advanced position (within the press) descent of the feed arm 16, unclamping of the workpiece from the clamp unit 17, ascent of the feed arm 16, and retraction of the carrier 14. On the other hand, the associated unloader 9 is normally set at the fully advanced position of its carrier 14, the first step in its stroke operation being the retraction of carrier 14 to its fully retracted position, the remaining steps being of the same general sequence as aforedescribed with respect to loader 6.

Since the loaders 6 and unloaders 9 are individually driven, the press line system is so arranged that when each loader 6 nears the completion of its stroke operation, it provides an actuation signal to its associated press, and after said press has completed its operation on the workpiece, a signal is provided to operate the unloader.

An intermittently driven conveyor 18 is disposed between adjacent presses for receiving the workpiece from the preceding press and for intermittently advancing the workpiece thereon to the succeeding press by a predetermined distance until the workpiece reaches a position to be received by the loader of the succeeding press. The intermittently driven versatile conveyor 18 plays an important role in the press line system of the invention. That is, the conveyor 18 on the unloading side of the preceding press includes a first movable platform station 19, which is normally positioned in its upper position, ready for descent and on the loading side of the succeeding press includes a second movable platform station 20, which is normally positioned in its lower position, ready for ascent. The intermittently driven conveyor 18 further has on the loading side of the succeeding press a workpiece positioning means (not shown) by means of which the loader 6 can feed the workpiece to a precise position in the associated press as the second station 20 on the conveyor 18 ascends. The intermittently driven conveyor further has an electric power source derived from either one of the adjacent preceding or succeeding presses, but has its own control device, to be explained in more detail hereinafter. In response to receipt of the workpiece by the first station 19 on the conveyor 18 from the preceding press, the conveyor is actuated, and in response to arrival of the workpiece at the loading side of the succeeding press and positioning of the workpiece by the positioning means, the second station 20 on the conveyor is caused to ascend so as to generate an actuation signal which actuates the loader on the succeeding press. However, the conveyor may also be driven completely independently of the presses by shifting a selector (not shown) in the control device.

Figure 3:
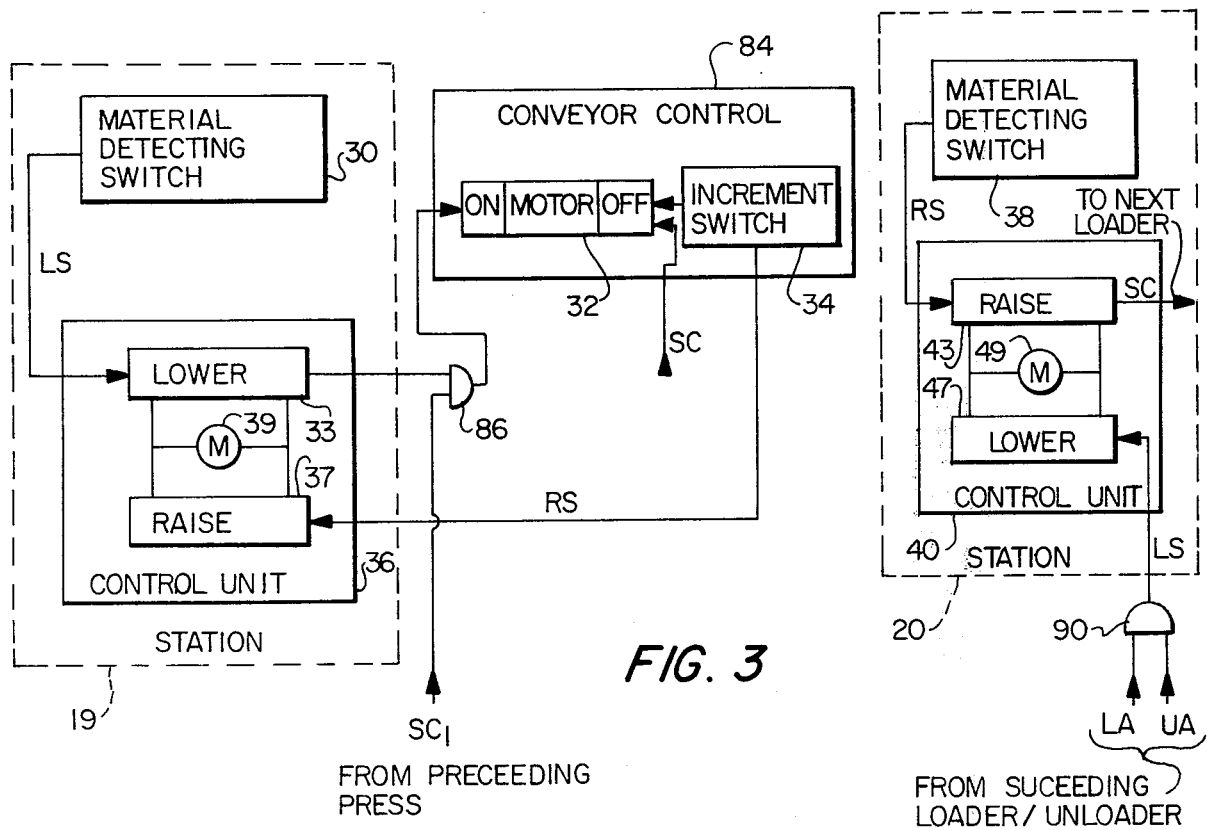
FIG. 3 is a further block diagram illustrating in schematic form one possible control system for the conveyor and station components in accordance with a preferred embodiment of the present invention.

In other words, as seen in FIG. 3, the first station 19 is provided with a first workpiece detection limit switch 30 which is actuated when the first station 19 receives the workpiece from the unloader on the preceding press. A lower station signal LS causes the first station platform to descend to deposit the work on the conveyor which is, in turn, actuated by, for example, a motor 32 to advance the workpiece by a predetermined distance as the first station descends. In response to advancement of the workpiece by the conveyor over the predetermined distance, an increment switch 34 is actuated to send a raise station signal RS to control unit 36 whereby the first station 19 returns to its normal upper position. The above-mentioned positioning means of the conveyor on the loader side is provided with a second workpiece detection limit switch 38 which is actuated when the workpiece reaches the above-mentioned positioning means as the workpiece is advanced in increments on the conveyor and generates a signal RS to control unit 40 of station 20 to raise the second station 20 so as to position the workpiece thereon in a workpiece clamping position with respect to the loader 6 of the succeeding press and, at the same time, provides a loader actuation signal (SC) to the succeeding press. After the loader of the succeeding press has been actuated, the second station descends in response to a signal LA from the actuated loader. In order to eliminate error in the operation of the press line system and to assure safe operation thereof, the second station 20 is actuated in response to signals from the succeeding loader 6 and unloader 9 such that the second station platform descends only when the station receives a signal UA which indicates that the unloader of the succeeding press is nearing completion of its operation, in addition to signal LA. In addition, the second station 20 is so arranged that the drive means for the conveyor 18, such as a cylinder-piston unit, for example, will not be actuated while the second station 20 remains in the upper position. On the other hand, the first station 19 is so arranged that even if the station has received the workpiece and a workpiece detection signal LS has been generated, the station will not descend or at least will remain stationarily in its lower position whereby the unloader of the preceding press is suspended in an intermediate position to stop the stroke operation of the press and the press line system is returned to its normal operation state only when the conveyor is driven in response of the stroke operation of the succeeding press.

The leading press 1 may be electrically connected to the feeder 7 such that the press may be actuated in response to supply of a workpiece by the feeder 7 or may be actuated when the operator manually supplies a workpiece to the press.

As mentioned above, according to the present invention, although the presses themselves are adapted to automatically operate in a stroke operation beginning with their respectively intended pressing operations which are initiated by the actuation of their respectively associated loaders and end with the discharge of the processed workpiece from the presses by their unloaders, the presses are not directly and mutually interlocked with each other, the intermittently driven conveyor 18 being controlled by the workpiece itself. As to the operative relationship between adjacent presses, since the operation of each succeeding press is not subject to any restriction by the operation of the preceding press, the desired number of presses out of a series of presses arranged in the press line system may be automatically operated. In order to assure a smooth automatic operation of the press line, the press line is designed so that the succeeding presses are operated at successively higher rates than those at which the preceding presses are operated.

Figure 2A:
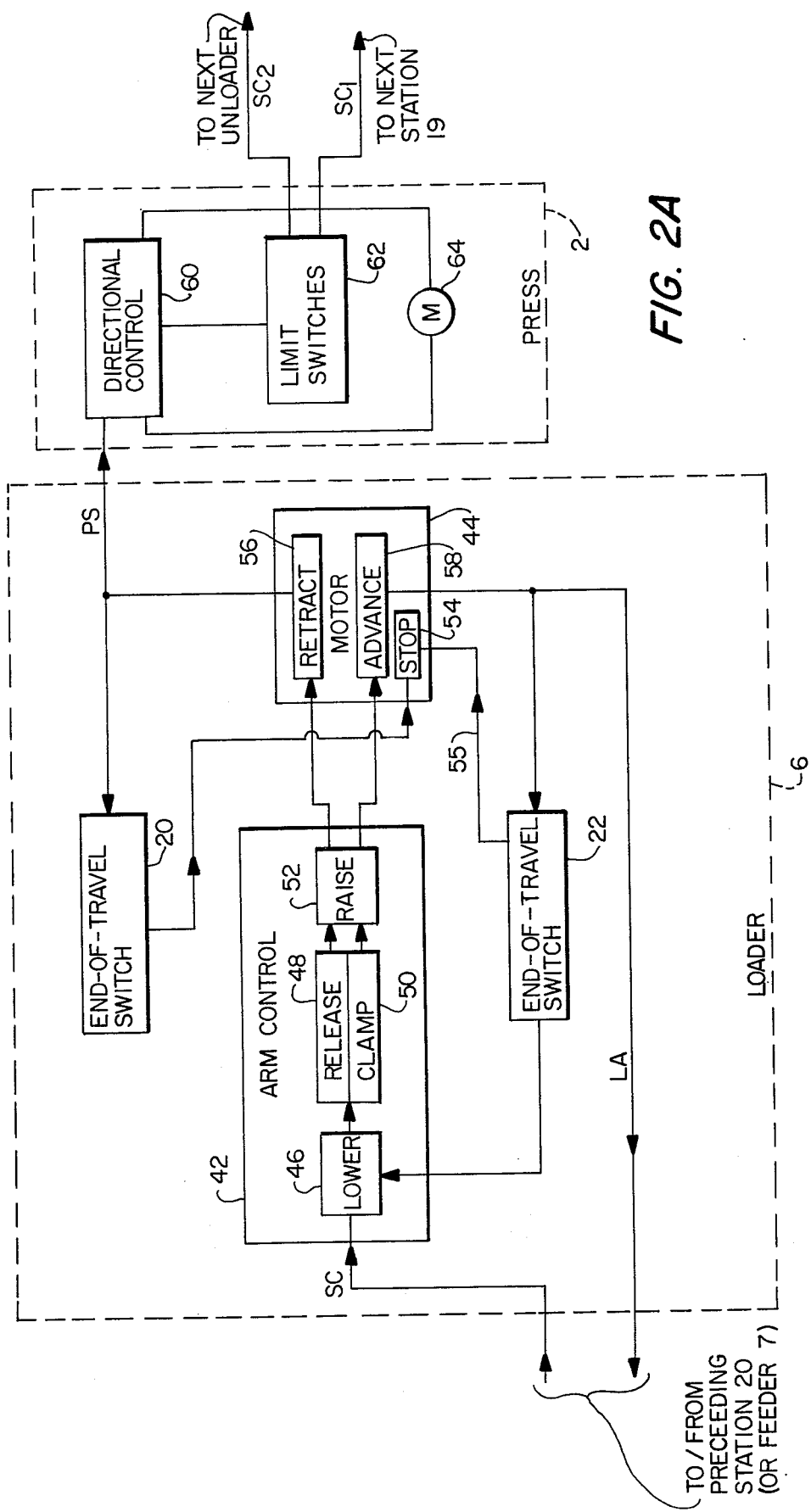
FIGS. 2A and 2B are block diagrams which illustrate in schematic form one possible control system for the loader, press, and unloader components of the preferred embodiment of the present invention.
Figure 2B:
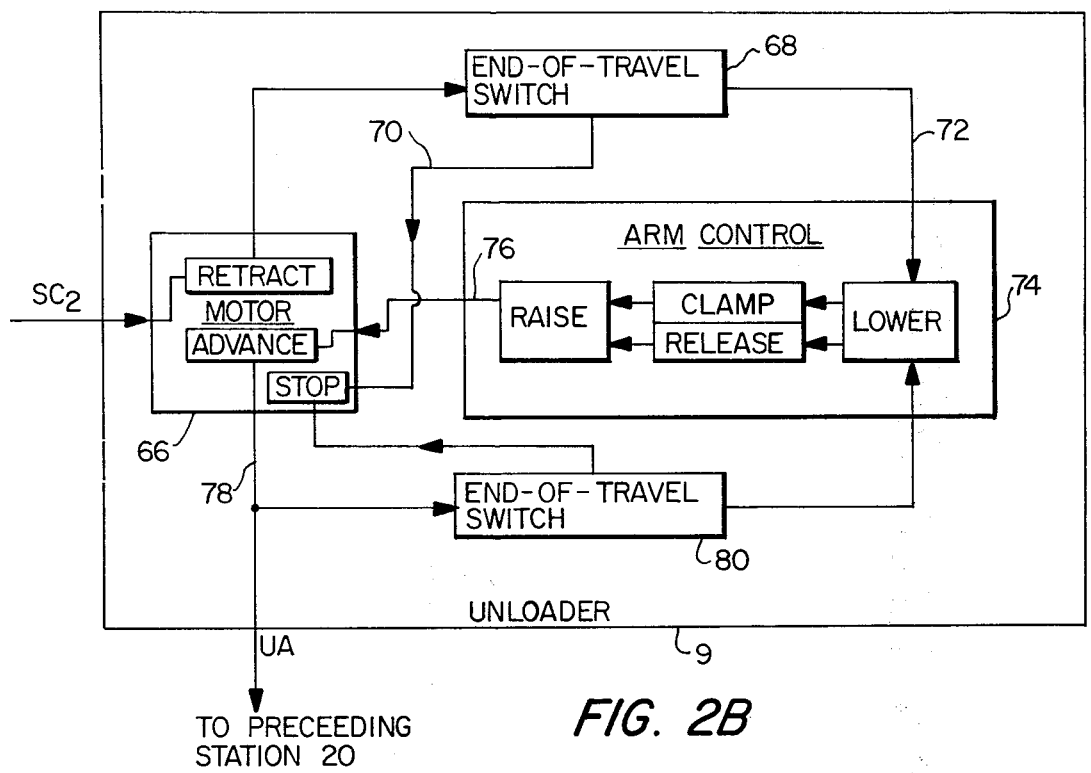

The operation of the press line system according to the present invention can be understood with the aid of FIGS. 2A, 2B and 3 which illustrate exemplary control circuitry and interconnections for the press line system of the present invention.

Referring first to FIGS. 2A and 2B, the loader 6 is seen to comprise an arm control section 42, a power source for loader 6 such as motor 44, and a pair of limit switches 20 and 22. Arm control unit 42 includes an actuation unit 46 for lowering feed arm 16, release 48 and clamp 50 actuation units belonging to clamp unit 17 which respectively release and clamp the associated workpiece, and an actuation unit 52 for raising the feed arm 16 of loader 6. Bidirectional motor 44 drives the associated crank arm 10 which, as explained hereinabove, either advances or retracts the respective associated carrier 14, in accordance with the rotational direction of motor 44, as conventionally controlled. For the sake of clarity, the modes of operation of motor 44 have been designated as a retract mode 56 and as an advance mode 58, there further being included a stop mode 54. End of travel switches 20 and 22, as explained hereinabove, are activated when the associated carrier 14 reaches the maximum points of its retraction or advancement, respectively. Further shown in FIG. 2 is a press unit 2 which includes a directional control 60, a pair of limit switches 62, which, when activated, generate signals $SC_1$ and $SC_2$, respectively, and a press motor 64, all of which components are conventional.

In operation, loader 6 is actuated by means of a start cycle signal SC received from the preceding conveyor station 20 and delivered into arm control unit 42. Start cycle signal SC is generated upon the occurrence of certain conditions in the preceding stages of the press line system which will become more clear hereinafter. It is therefore noted that press 2 is an intermediate press in the press line system.

Upon the receipt of start cycle signal SC, the feed arm 16 of loader 6 is lowered by, for example, conventional hydraulic means, in response to actuation by unit 46. The lowering of arm 16 initiates the cycle of loader 6 as explained hereinabove. In other words, after feed arm 16 descends, the clamp unit 17 thereon are caused to clamp the workpiece from its associated station. Thereafter, the feed arm 16 is raised by virtue of unit 52 and, at the same time, the carrier 14 is advanced to its fully advanced position by virtue of advance control 58 of motor unit 44. At the end of the fully advanced position of carrier 14, an end of travel switch 22 is actuated so as to send a signal along line 55 to stop motor 44, and which further actuates arm control unit 42 so as to again cause the descent of feed arm 16 thereof by virtue of actuation unit 46. The next step is to cause the release by clamp unit 17 of the workpiece held thereby by virtue of unit 48, whereafter the feed arm 16 is raised by unit 52 and the motor 44 then begins to retract under the control of retract control 56. Motor 44 retracts to its fully retracted position, having already disposed of the workpiece in the press, and thereby provides a press start signal PS to the directional control 60 of press 2. Motor 44 will continue to move in its retract mode until carrier 14 actuates the end of travel switch 22 to stop motor 44.

Directional control 60 of press 2 activates motor 64 thereof so as to cause the press to operate on the just deposited workpiece from loader 6. The beginning of movement of the press heads toward one another actuates one of the limit switches 62 so as to generate a signal $SC_1$, the purpose of which will be described in more detail hereinafter. After the workpiece just deposited has been pressed by press 2, and the heads thereof begin to separate, a second limit switch 62 is activated which generates a second start cycle signal $SC_2$ which is fed to the unloader 9 associated with press 2 (see FIG. 2B).

Referring now to FIG. 2B, the signal $SC_2$, indicating the separation of the press heads from the now-pressed workpiece, initiates the retract mode of motor 66 of unloader 9. Thus, carrier 14 of unloader 9, normally in its fully advanced position, begins to retract toward press 2 and the just pressed workpiece positioned therein. When carrier 14 of unloader 9 reaches its fully retracted position (almost centered above the workpiece in press 2) the end of travel switch 68 is actuated which sends, in turn, a signal along line 70 to momentarily stop motor 66, and further sends a signal along line 72 to the arm control unit 74 of unloader 9. The arm control unit 74, which may be comprised of identical components to the arm control unit 42 of loader 46, causes the feed arm 16 of unloader 9 to be lowered, the workpiece to be clamped by clamp unit 17, and the feed arm 16 to be raised, thereafter issuing a signal along line 76 to cause motor 66 to switch to its advanced mode. At this junction, the clamp unit 17 of feed arm 16 of unloader 9 has successfully clamped the workpiece from the press 2 and has begun an advance motion back to its most advanced position which, incidentally, is over the first station 19 of conveyor 18.

Upon the initiation of the advance motion of motor 66, an unloader advance signal UA is transmitted via line 78 to a preceding conveyor station 20, the purpose of which will become more clear hereinafter. When carrier 14 of unloader 9 has advanced with the workpiece to its most advanced position, the end of travel switch 80 is activated which, in turn, stops motor 66 and lowers feed arm 16, releases the workpiece from clamping unit 17, and raises feed arm 16 back to its normal position. Thereafter, the unit remains ready to receive the next start cycle signal $SC_2$ from press 2.

Referring now to FIG. 3, stations 19 and 20 of conveyor 18 are shown in conjunction with conveyor control unit 84. Station 19 is seen to include a material detecting switch 30 and a control unit 36. Control unit 36 includes means 33 and 37 for respectively lowering and raising station 19 by means of controlling drive means 39, such as a motor. Station 20 is constructed similarly. Conveyor control unit 84 includes a motive force 32 having an on and off control, and an increment switch 34.

In operation, station 19 is activated when a workpiece is delivered thereto by the immediately preceding unloader unit 9. Material detecting switch 30 may be, for example, sensitive to the positioning of a workpiece on the platform of station 19 so as to generate a lower station signal LS to cause motor 39 to lower the platform of station 19. The output from lower control unit 33 also provides one enabling input to an AND gate 86. The other enabling input to AND gate 86 is provided by signal $SC_1$ which, as noted above, is generated at the initiation of the operation of the preceding press 2 by virtue of the respective heads actuating one of the limit switches 62. The plural receipt of the signals ensures that the conveyor 18 will not be actuated until both the workpiece has been delivered to the station 19 and the press 2 has begun operation on the succeeding workpiece. Such events assumingly having occurred, motor 32 of conveyor control unit 84 is activated. When the workpiece on conveyor 18 has moved a predetermined distance thereon, an increment switch 34, placed in the path of the advancing workpiece, is activated so as to turn off motor 32. The activation of increment switch 34 further generates a raised station signal RS which is fed to raise control 37 of unit 36 so as to cause motor 39 to raise the respective platform of station 19 back into its workpiece receiving position. The latter action occurs, of course, only after the preceding workpiece has been conveyed from the station platform by the conveyor 18 so as to activate increment switch 34.

When the workpiece has advanced a sufficient number of increments to reach the second station 20, which is located adjacent the loading side of the succeeding press 3 a material detecting limit switch 38 is activated so as to generate a raised station signal RS to control unit 40 of station 20. The activation of raise unit 43 of station 20 in turn generates a start cycle signal SC which is fed to the arm control unit of the succeeding loader 6 belonging to press 3 so as to initiate the operation thereof. The loader 6 of press 3 will, in turn, load the workpiece just received by station 20 onto press 3, the automatic operation of the press 3 and its associated loader, unloader, conveyor and the like proceeding exactly as described above with respect to press 2.

The movable platform of station 20 is lowered by a lower station signal LS which is generated by, for example, an AND gate 90 upon the plural receipt thereof of a loader advance signal LA and an unloader advance signal UA from the succeeding loader 6 and unloader 9 of press 3. In this manner, it is assured that the press 3 will not receive any further workpieces until both its loader and unloader are properly operating in the advance mode. Further, it should be noted that the start cycle signal SC from raise unit 43 is also fed to the motor 32 of conveyor control 84 in order to inhibit the operation of conveyor 18 until the platform of station 20 has been properly lowered.

It should be understood that with respect to the leading press 1, a signal for the actuation thereof may be provided upon the manual supply of the work by the operator or may be supplied by the feeder 7 after the provision of a workpiece to press 1. The unloader thereof operates similar to the above-described unloaders.

As is clear from the above description of the press line system of the present invention, it is possible to provide an automatic press line by operatively connecting a desired number of existing presses together by means of intermittently driven conveyors without requiring any expensive particular design presses, and the number of presses to be employed for the automatic press line can be optionally selected to assure an automatic and effective synchronization operation of the press line.

In the foregoing, the invention has been described with reference to one specific illustrative embodiment. It will be evident, however, that variations and modifications, as well as the substitution of equivalent parts or elements for those shown herein for illustration, may be made without departing from the broader scope and spirit of the invention as set forth in the appended claims. The specification and drawings are accordingly to be regarded in an illustrative rather than in a restrictive sense.

I claim:

1. A press line system including a series of individually driven presses arranged in a line and each press having a feed side and a delivery side, the first press in the line having an unloader at the delivery side and means for feeding work thereto, each of the other presses having a loader at the feed side and an unloader at the delivery side, an intermittently driven conveyor arranged between the unloader and loader of each two adjacent presses in the line for moving the work from the preceding press to the succeeding press, each loader and unloader having a reciprocable carrier movable between fully advanced and fully retracted positions, each carrier having a feeding arm capable of upward and downward movements, a work clamping means carried by each feeding arm, said conveyor having a loading end adjacent the unloader of a preceding press and an unloading end adjacent the loader of a succeeding press, a first work receiving station, means mounting the first station at the loading end of each conveyor for upward and downward movements, said first station normally being in an elevated position, a second work receiving station, and means mounting the second station at the unloading end of each conveyor, said second station normally being in a lowered position, the arrangement being such that when work is fed to the first press, the first press operates on the work and upon completion thereof actuates the unloader for discharging the work from the press and clamping means which clamps the work, raises the feeding arm, retracts the carrier, lowers the feeding arm, unclamps the work, raises the feeding arm and deposits the work on the elevated first work receiving station which moves downward and positions the work on the conveyor which advances to the second work receiving station whereupon the first station is moved to its normal elevated position and the second station moves upward to load the work in the loader of the succeeding press which initiates a similar operation of the succeeding press.

2. The press line system as claimed in claim 1, in which said first work receiving station is provided with control means operative upon deposit of the work thereon to move the station downward to position the work on the conveyor, advance the conveyor and move the first station upward to its normal elevated position and said second work receiving station being provided with control means operative when the work reaches the second station to move the second station upward to feed the work into the loader of the succeeding press and move the second station downward to its normal lowered position.

3. The press line system as claimed in claim 2 in which said first press is electrically operated in response to the supply of work to the first press.

* * * * *